US010280960B2

(12) United States Patent
Giovannetti (10) Patent No.: US 10,280,960 B2
(45) Date of Patent: May 7, 2019

(54) DEVICE FOR ASSEMBLY/JOINING OF PARTS OF MODULAR FURNITURE AND FURNISHING ACCESSORIES

(71) Applicant: EFFEGI BREVETTI S.R.L., Segrate (Milan) (IT)

(72) Inventor: Antonio Giovannetti, Segrate (IT)

(73) Assignee: EFFEGI BREVETTI S.R.L., Segrate (Milan) (IT)

( * ) Notice: Subject to any disclaimer, the term of this patent is extended or adjusted under 35 U.S.C. 154(b) by 420 days.

(21) Appl. No.: 15/303,884

(22) PCT Filed: Apr. 10, 2015

(86) PCT No.: PCT/EP2015/057847
§ 371 (c)(1),
(2) Date: Oct. 13, 2016

(87) PCT Pub. No.: WO2015/158622
PCT Pub. Date: Oct. 22, 2015

(65) Prior Publication Data
US 2017/0037891 A1    Feb. 9, 2017

(30) Foreign Application Priority Data

Apr. 14, 2014   (IT) .............................. MI2014A0696

(51) Int. Cl.
*F16B 12/22*         (2006.01)
*F16B 12/54*         (2006.01)
(Continued)

(52) U.S. Cl.
CPC .......... *F16B 12/22* (2013.01); *A47B 47/0091* (2013.01); *A47B 96/066* (2013.01);
(Continued)

(58) Field of Classification Search
CPC ...... F16B 12/22; F16B 12/54; F16B 12/2027; F16B 12/2036; A47B 47/0091;
(Continued)

(56) References Cited

U.S. PATENT DOCUMENTS 6,986,488 B2 *   1/2006   Migli .................. A47B 96/066
                                                            248/239

FOREIGN PATENT DOCUMENTS

CH         101351 A      9/1923
CH         415999 A      6/1966
(Continued)

OTHER PUBLICATIONS

International Search Report, dated Jun. 12, 2015, from corresponding PCT Application.

*Primary Examiner* — Bayan Salone
(74) *Attorney, Agent, or Firm* — Young & Thompson (57) ABSTRACT

An assembly/joining device (10) for parts or components of modular furniture and furnishing accessories of the shelf units, bookcases, cupboards, bed frames type and the like, including a pin (12) and a bushing (14) inserted in dedicated seats made in the components of the furniture to be joined and attached rigidly one with respect to the other, the pin (12) which includes a ferrule (24) elastically retractable internally to the pin apt to couple with the bushing (14) and co-operating with guide elements of the bushing (14) for a coupling/uncoupling between the pin (12) and bushing (14) during assembly/disassembly of the furniture parts.

8 Claims, 6 Drawing Sheets

(51) Int. Cl.
*A47B 47/00* (2006.01)
*A47B 96/06* (2006.01)
*F16B 12/20* (2006.01)

(52) U.S. Cl.
CPC ...... *F16B 12/2027* (2013.01); *F16B 12/2036* (2013.01); *F16B 12/54* (2013.01); *A47B 2230/07* (2013.01); *A47B 2230/16* (2013.01)

(58) Field of Classification Search
CPC .............. A47B 96/066; A47B 2230/16; A47B 2230/07; Y10T 29/49625
USPC .......... 312/111, 333, 263, 334.4, 329, 319.1, 312/257.1; 482/51, 54; 49/366; 16/54, 16/296, 286, 288, 319, 337; 248/201, 248/221.11
See application file for complete search history.

(56) References Cited

FOREIGN PATENT DOCUMENTS

| | | | |
|---|---|---|---|
| DE | 1 921 483 A1 | 11/1970 | |
| DE | 26 24 273 A1 | 12/1977 | |
| EP | 2 609 833 A1 | 7/2013 | |
| EP | 2609833 B1 * | 6/2015 | ............ A47B 96/066 |
| FR | 1 547 784 A | 11/1968 | |
| FR | 2 649 453 A1 | 1/1991 | |
| WO | 2013/164753 A1 | 11/2013 | |
| WO | 2013-U16067 * | 11/2013 | ............. A47B 57/22 |

* cited by examiner

DEVICE FOR ASSEMBLY/JOINING OF PARTS OF MODULAR FURNITURE AND FURNISHING ACCESSORIES

The present invention relates to a device for assembly/joining of parts of modular furniture and furnishing accessories.

More particularly the present invention relates to a device for assembling furniture of the shelf units, bookcases, cupboards, bed frames type and similar furnishing accessories.

As is known, in the sector of construction/production of furniture, both on an industrial and artisanal level, the component parts of the item of furniture are assembled and optionally rigidly restrained on to the other using different types of retaining means.

Referring by way of an example to an item of furniture of the bookcase type or to a shelf unit, it comprises typically two vertical uprights tendentially parallel one to the other between which are interposed, along a plane perpendicular to the plane of longitudinal development of the same uprights, one or more shelves having the function of defining a plane of resting and support for books, magazines, vases and/or other multiple and different objects.

The shelves are placed with respect to the uprights using shelf support elements attached and projecting with respect to the same and positioned to simply rest on the projecting part of the shelf support or with the projecting part of said shelf supports which engages with appropriate grooves or pockets formed on the surface of the shelves in a position corresponding to that of the shelf support.

Other techniques of assembly allow a fixed and rigid connection of the shelf with respect to the structure of the uprights via expansion joints generally inserted in the shelves and co-operating with grooves or openings in the uprights or, vice versa, with said joints which expand radially under the action of a dedicated tool or due to an elastic effect, performing the clamping action, or by means of bushings inserted in the shelves (or in the uprights) provided with an internal helical path and co-operating in clamping with corresponding pins inserted in the uprights (or in the shelves), said bushings being rotated by means of a tool of the screwdriver or Allen key type or the like, so as to perform the restraint for clamping with respect to the pin and, consequently, the rigid stabilisation of the shelf with respect to the uprights.

However these known and traditional methods of assembly of furniture have some major disadvantages, mainly linked to the need to perform multiple machining processes on the components to be restrained reciprocally to form a specific item of furniture or furnishing accessory. For example in the case of a bookcase machining processes would be necessary both on the uprights and on the shelves for forming the seats of the shelf support elements.

A further disadvantage is linked to the fact that the traditional techniques of assembly discussed above use hardware elements which remain on view and, consequently, they are little appreciated at an aesthetic level. For this reason plugs or plates are often used to close the grooves for housing the retaining elements which are aesthetically unattractive.

The document DE 1921483 describes a device or union for the joining of parts of furniture which comprises a fork clamping bolt apt to be inserted in an appropriate seat of one of the components to be joined and inside whereof a pin is placed, developed in the direction of longitudinal development of the bolt and provided with a transverse clamping head apt to engage with the other component to be joined.

A lever hinged with respect to the bolt drives the backward movement of the projecting head of the pin.

The object of the present invention is that of obviating the disadvantages stated above.

More particularly an object of the present invention is that of providing devices for joining of parts or components making up furniture and furnishing accessories which are substantially completely hidden from view so as to optimise the aesthetic worth of the furniture.

A further object of the present invention is that of providing joining devices for the assembly of furniture which allow a reduction in the machining processes necessary for the construction of this furniture.

A further object of the present invention is that of providing joining devices which allow an easy, convenient and rapid assembly and disassembly of the component parts of the furniture (for example the mounting of shelves in a bookcase), ensuring stable attachment of these component parts.

A further object of the present invention is to make available to users a device for assembly/joining of parts or components of furniture suitable for ensuring a high level of resistance and reliability in time and such, moreover, as to be easily and economically produced.

These and other objects are achieved by the device of the invention that has the features of claim 1.

According to the invention an assembly/joining device is provided for parts or components of modular furniture and furnishing accessories of the shelf units, bookcases, cupboards, bed frames type and the like, comprising a pin and a bushing inserted in dedicated seats made in the components of the furniture to be joined and fixed rigidly one with respect to the other, the pin comprises a ferrule elastically retractable internally to the pin apt to couple with the bushing and co-operating with guide means of the bushing for a coupling/uncoupling between said pin and bushing during assembly/disassembly of the furniture parts.

Advantageous embodiments of the invention are disclosed by the dependent claims.

The constructional and functional features of the device for assembly/joining of components or parts of furniture and furnishing accessories of the present invention will be made clearer by the following detailed description, in which reference is made to the accompanying drawings which represent a preferred and non-limiting embodiment thereof, in which.

Figure 7:
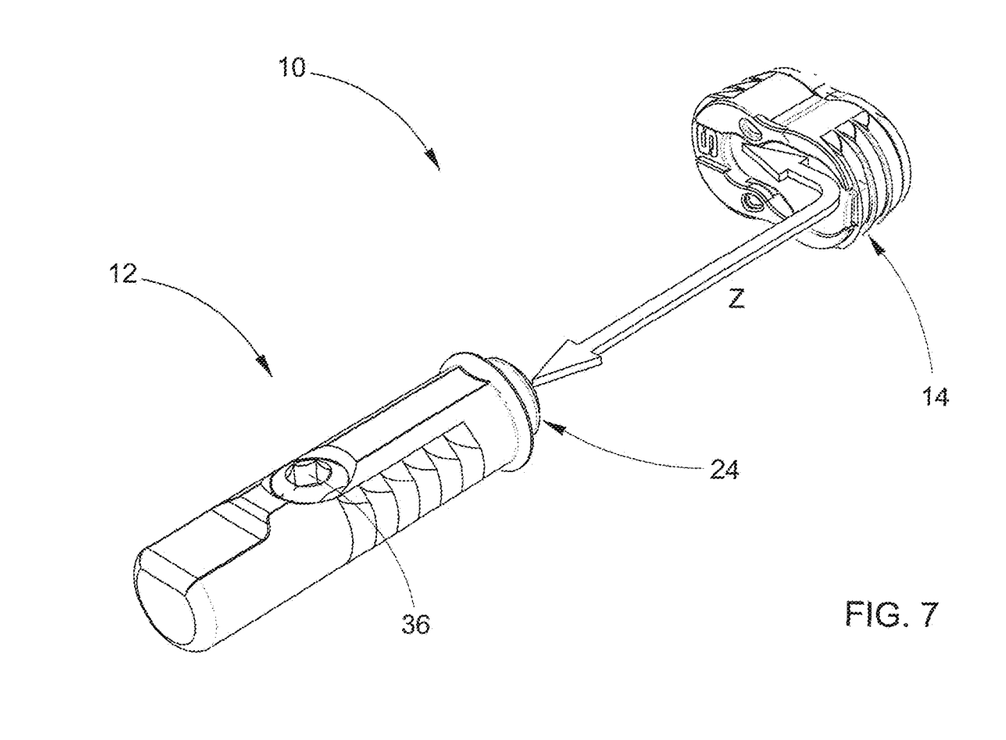
FIG. 7 shows an axonometric view illustrating the mode of coupling between the aforementioned two components of the device of the invention.

Referring to the aforementioned drawings, the device for assembly/joining of parts of furniture and furnishing accessories of the present invention, denoted overall by 10 in FIGS. 7 and 8, comprises a pin 12 apt to be inserted in a shelf 11 and a bushing 14 apt to be inserted in an upright 13 of an item of furniture 15 (for example a bookcase or shelf unit as schematised in FIGS. 10 to 13) with said pin 12 and bushing 14 co-operating according to the methods detailed below.

Figure 1:
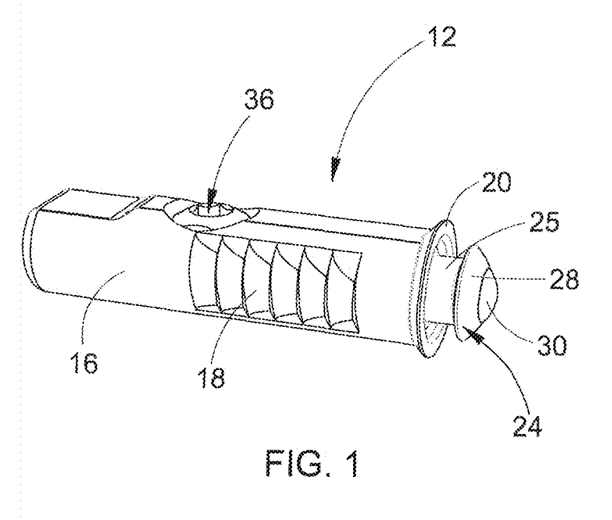
FIG. 1 shows schematically an axonometric view of a component of the device for assembly/joining of furniture of the present invention.
Figure 2:
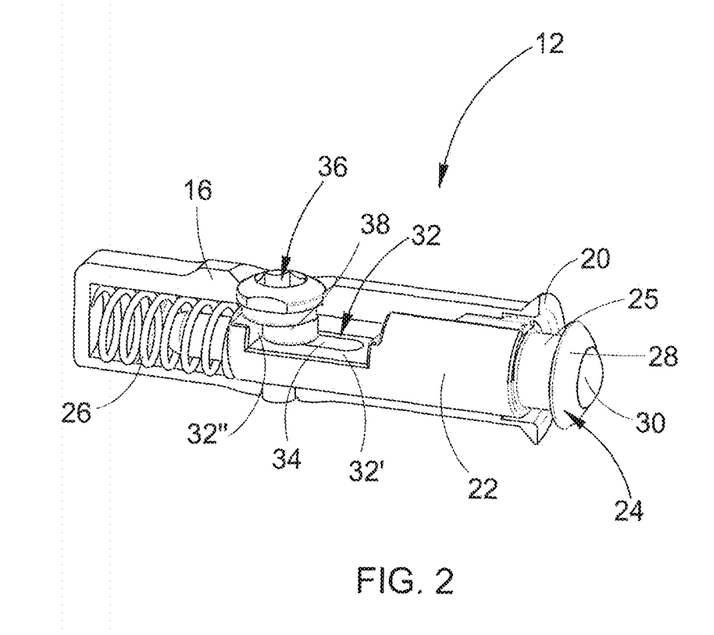
FIG. 2 shows schematically an axonometric view partially sectioned along an axial plane of the component as per FIG. 1.

The pin 12 comprises an outer body or casing 16 with a substantially cylindrical shape, made preferably in plastic material or nylon or in another material equivalently known and suitable for the purpose, internally hollow and open at one end, provided with a serrated portion 18 formed axially along a part or the entirety of the longitudinal development of the same casing with the function of ensuring a greater grip on the inner surface of the housing hole formed in a shelf of an item of furniture to be assembled and provided, likewise, at the open end, with an annular expansion or collar 20 having the function of defining an element of stop of the pin when it is introduced into said hole of the shelf as described here below.

Inside the outer body or casing 16 of the pin 12 a slider 22 is axially positioned provided with an integral and integrated ferrule 24 inserted coaxially to said cursor 22 and an elastic contrast element 26 of the helical spring type placed between the base of the casing 16 and the slider 22 on the opposite side with respect to the ferrule 24 and whose function is detailed here below.

The ferrule 24 comprises a stem 25, a head 28 with greater diameter with respect to the stem and comprised within the inner diameter of the body or casing 16, provided with a vertex portion 30 made in Teflon or silicone or another similar material with anti-friction properties.

The slider 22 comprises, on the side opposite to that of the ferrule 24, a pocket 32 formed transversely starting from the outer side surface of the slider and developed along a cutting plane parallel to the axial plane of the same slider.

Starting from a base surface 32' of the pocket 32 a through slot 34 is formed, longitudinally developed in the axial direction of the slider and apt to define the seat for a grub screw 36 inserted transversely to the outer body or casing 16 and to the slider 22.

Said grub screw 36 comprises a portion 38 placed eccentrically with respect to the axis of the grub screw and defining a cam whose profile engages with the side surface of the pocket 32 of the slider 22 to perform the movement detailed here below.

Figure 3:
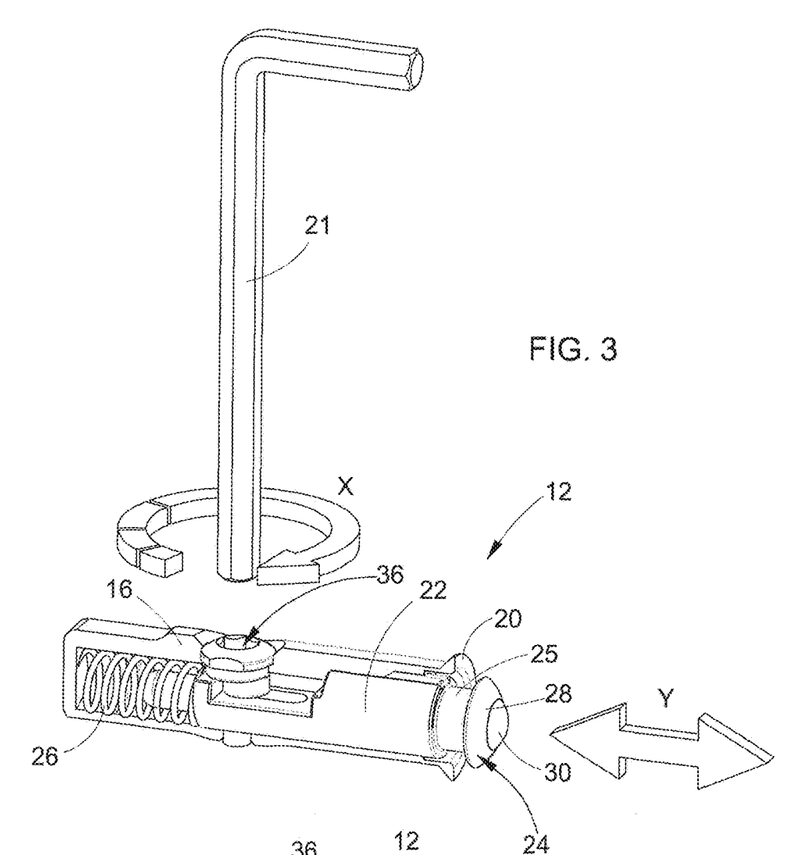
FIG. 3 shows schematically the component as per FIGS. 1 and 2, in an axonometric view, partially sectioned, according to a first working position and with the schematisation of a mode of movement of the elements of the same according to what is detailed below.

FIG. 3 illustrates schematically the action of said portion 38 on the slider 22 starting from a first working or rest position wherein the slider 22 is placed with the rear face of the pocket 32 turned in the direction of the helical spring 26, in contact with the portion 38 and with the ferrule 24 externally projecting with respect to the collar 20 of the outer body or casing 16 of the pin 12.

By acting on the grub screw 36 with a tool 21 of the Allen key type or with another equivalent tool suitable for the purpose, a rotation of said grub screw is imposed (as indicated by the arrow X in FIG. 3), for example clockwise, with the portion 38 of the grub screw 36 which, acting along the inner rear profile 32" of the pocket 32 of the slider 22, imposes an axial displacement (indicated by the arrow Y) of the same slider 22 inside the outer body or casing 16 with a compression of the helical spring 26. In this second working position, schematised in FIG. 4, the ferrule 24, integral with the slider 22, has partially moved backwards inside the body or casing 16 with the vertex portion 30 which remains projecting with respect to the collar 20 of said same casing 16.

Figure 4:
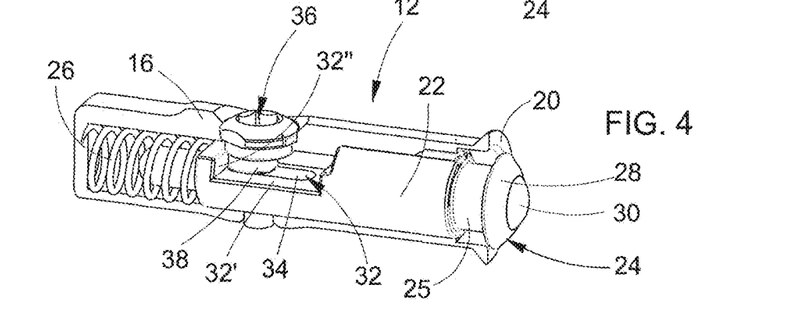
FIG. 4 shows schematically the component as per FIGS. 1 and 2 according to a second working position.

By rotating the grub screw 36 in an opposite direction, for example anticlockwise, the slider 22 is returned into rest position with the head 28 of the ferrule 24 externally projecting with respect to the edge 20 of the body or casing 16.

Figures 5, 6:
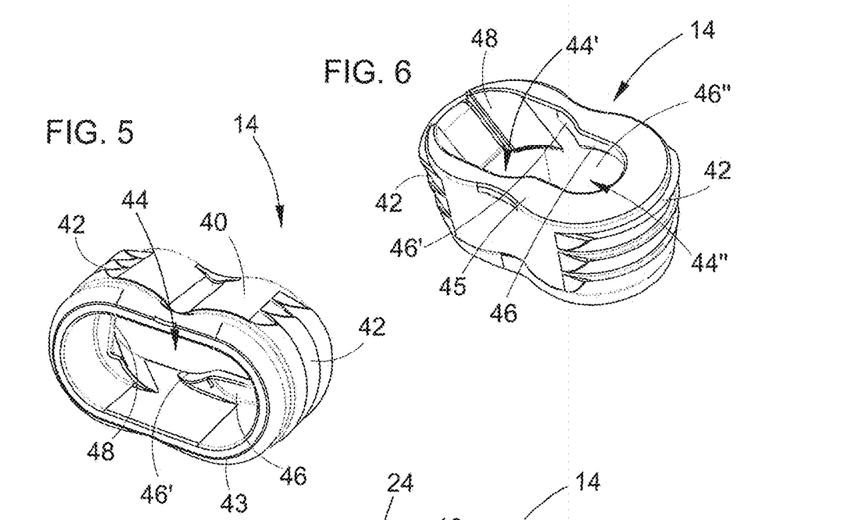
FIG. 5 shows schematically a further component of the device of the invention shown in an axonometric view of the back.
FIG. 6 shows schematically a further axonometric view from the front of the further component of the assembly device of the invention with the two components coupled.

The bushing 14 of the assembly device 10 of the invention, schematised in detail in FIGS. 5 and 6, comprises a body 40 with a substantially oval shape with the outer side surface provided with a serrated portion 42 having the function of guaranteeing a greater grip of the bushing in the respective seat of insertion (for example the seat formed in the surface of the uprights or shoulders of a bookcase or similar item of furniture) and provided centrally with a through opening 44 with slotted shape apt to allow an action of engaging/coupling with the pin 12 according to the methods described below.

The transverse dimension of said opening 44 is substantially corresponding to the diameter of the head 28 of the ferrule 24 so as to allow an insertion with play of said expansion in said opening.

The through opening 44 comprises a first portion 44' at which and starting from a front face 45 opposite a rear face 43 of insertion of said bushing with respect to the dedicated seat of the item of furniture, in the direction of said rear face 43, a slanted plane or surface 48 and a second portion 44' develops which, at the front face 45, has an appendage or lip 46 developed along part of the inner circumferential edge of the opening 44 along the plane of the front face 45 with narrowing of the opening 44.

More particularly the appendage or lip 46 comprises two opposite slanted portions 46' which, starting from the inner edge of the front face 45, develop with increasing slope to define a C-shaped compartment 46" apt to accommodate a circumferential portion of the stem 25 of the ferrule 24 and having a dimension corresponding to the diameter of said stem in order to create a connection by interference with the pin 12.

Moreover the thickness of the appendage or lip 46 corresponds substantially to the distance between the lower face of the head 28 of the ferrule 24 and the front face of the collar 20 of the casing 16 measured in the rest condition when the head 28 is externally projecting with respect to the casing 16.

The method of coupling between the pin 12 and the bushing 14, described above with reference to their constructional features, is detailed here below with reference to FIGS. 7 and 8.

The pin 12 is coupled to the bushing 14 with a movement (denoted by the arrow Z in FIG. 7) which comprises a first movement along the direction of the axis of the pin 12 and a second movement along a direction perpendicular to that of the axis of the same pin.

With the first movement the head 28 of the ferrule 24 of the pin 12 is at the first portion 44' of the through opening 44 of the bushing 14, i.e. at the slanted plane or surface 48. In this position the ferrule 24 together with the slider 22 whereto it is integral, as explained in greater detail here below, is retracted internally to the body or casing 16 with the head 28 substantially flush or slightly projecting with respect to the edge 20 of the casing 16.

With the second movement, perpendicular to the first movement and directed towards the second portion 44" of the opening 44, the ferrule 24 is introduced in the C-shaped compartment 46" of the appendage or lip 46 of the second portion 44" of the through opening 44 of the bushing 14.

The two opposite slanted portions 46' of the appendage or edge 46 define a guide to the entry of the ferrule 24 and, in particular, of the stem 25, in said compartment 46" and the slanted plane 48, in this phase, being orientated in the direction of the lower face of the bushing opposite to the front face wherefrom the appendage or lip 46 develops, accompanies the exit of the head 28 of the same ferrule 24 with respect to the edge 20 of the casing 16, co-operating with the elastic element or spring 26.

The forcing of the pin 12 with respect to the bushing 14 takes place due to a connection with interference between the ferrule 24 of the pin 12 and the C-shaped compartment 46" of the bushing 14.

Figure 8:
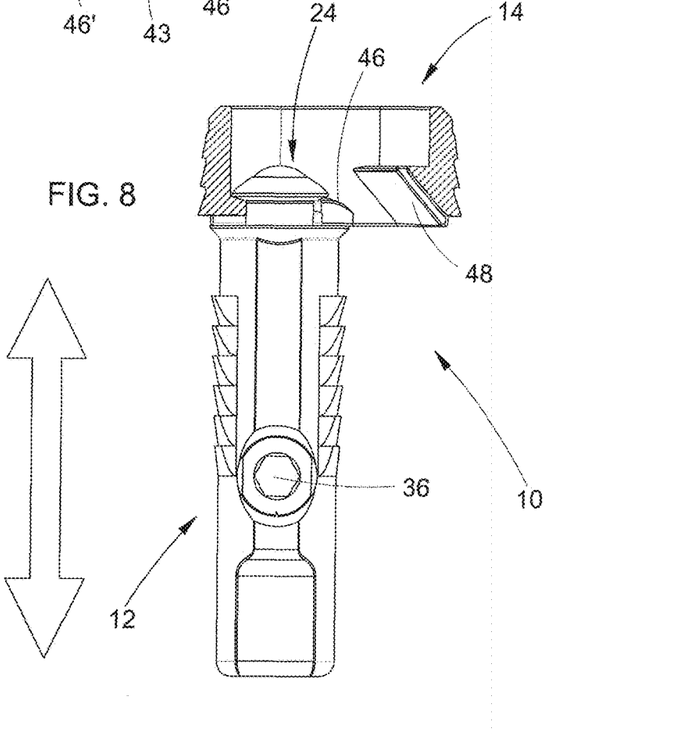
FIG. 8 represents schematically a partially sectioned view from above of the device of the invention.

However a further forcing or locking is possible in addition to the connection by interference and performed by acting with the tool 21 on the grub screw 36 to impose thereon a rotation which, through the action of the cam 38, causes a backward movement of the slider 22 inside the casing 16 and the consequent contact of a lower face of the head 28 with a rear face of the appendage or lip 46 of the bushing 14 and of the edge or collar 20 of the body or casing 16 with the front face 45 of the bushing, as schematised in FIG. 8.

In practice the two components, pin 12 and bushing 14, of the device according to the invention can be assembled removably, allowing a manual assembly and disassembly of the shelves, or in a fixed way by rotating the grub screw 36 by means of the tool 21, in which case the removal of the shelf requires the use of the tool 21 to rotate said grub screw 36 in the position of releasing of the slider 22.

Referring to FIGS. 9 to 12 an example of application is schematised of the device of the invention used for the assembly of an item of furniture 15 of the bookcase or shelf unit type.

Figure 9:
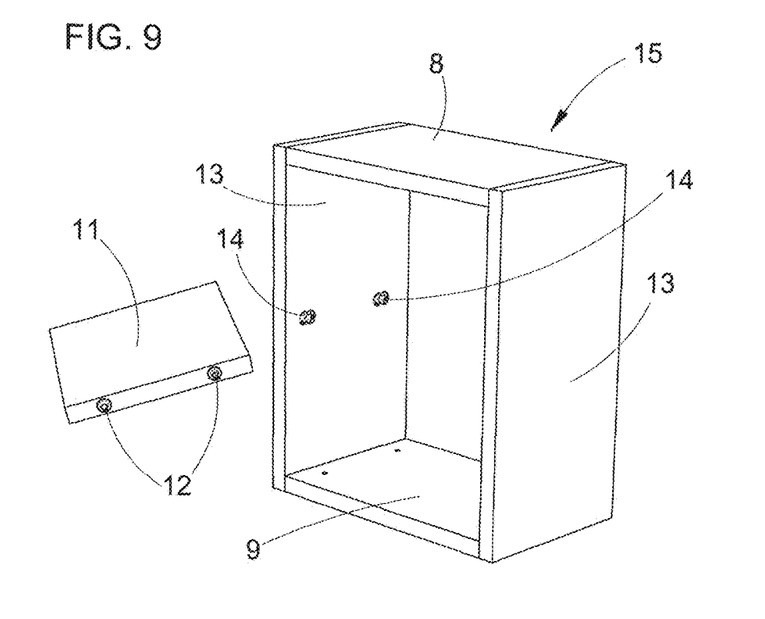
FIGS. 9 to 12 show schematically and in an axonometric view the phases of assembly of an item of furniture, specifically of the assembly of a shelf of a shelf unit or bookcase, by means of the assembly/joining device of the invention.

The item of furniture 15 comprises two opposite and parallel uprights or shoulders 13, an upper plane 8 and a lower plane 9 interposed perpendicularly to the two opposite uprights 13 at their end edges to define an upper base and a lower base of the aforementioned item of furniture which takes on, in this way, the shape of a boxed body with one or two open sides.

Inside said boxed body one or more shelves 11, parallel one to the other, are positioned and secured, according to what is detailed below.

The bushings 14 are attached to the opposite uprights 13, in dedicated seats formed on the inner faces of the boxed body with the front face 45 not projecting with respect to the inner face of the uprights or shoulders, while the pins 12 are inserted in appropriate seats or holes formed along the opposite side edges of the shelves, in positions corresponding to those of the bushings 14, the bodies or casings 16 being completely inserted in said holes with the edge 20 defining an element of stop/contact with respect to the surface of the edges of the shelves and with the heads 28 of the ferrules 24 externally projecting with respect to said bodies or casings (rest position of the pin 12).

Figure 10:
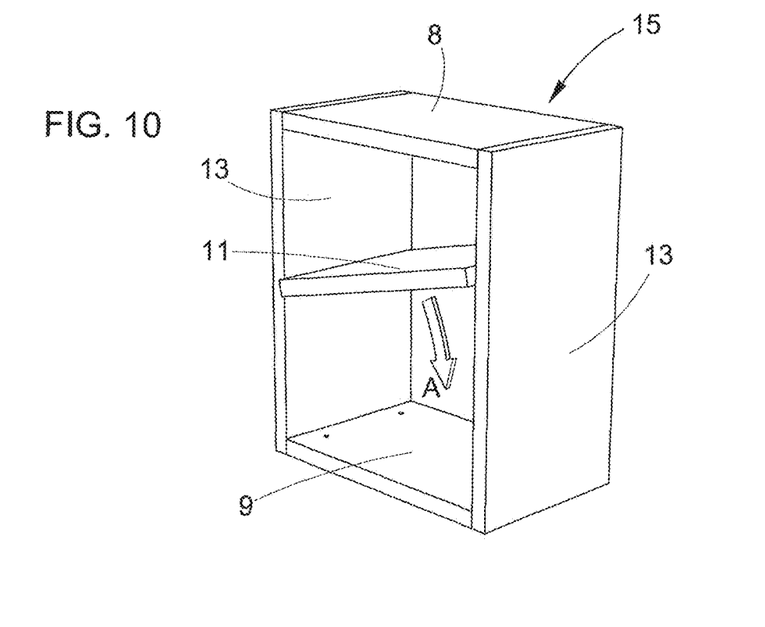

The shelf 11 provided with pins 12 is inserted in the boxed body of the item of furniture 15 in a slanted position with respect to the uprights (bearing in mind the fact that the heads 28 of the pins 12 are externally projecting) so that the pins placed along one of the edges of the shelf go into contact with the corresponding bushings of one of the uprights at the first portion 44' of the through opening 44 where the slanted plane 48 is formed and, subsequently, brought into position perpendicular to the uprights as indicated by the arrow A in FIG. 10, i.e. with a lowering from the slanted position of starting/introduction to the horizontal position, substantially with a rotation around points of first contact between bushings and pins.

During this movement the heads 28 of the ferrule 24 opposite that already in contact with the bushing at the opposite upright, being in contact with the surface of one of the uprights, slides against the same. However the vertex portion 30 of the head 28 of the ferrule 24, being made in Teflon or another equivalent and suitable material, allows the sliding of the ferrule with low friction and without collapse of the uprights.

Moreover the movement indicated by the arrow A imposes on the ferrule 24 of the pin 12 a backward movement which brings the head 28 flush with the plane of the edge 20 of the casing 16 of the pin 12.

Figure 11:
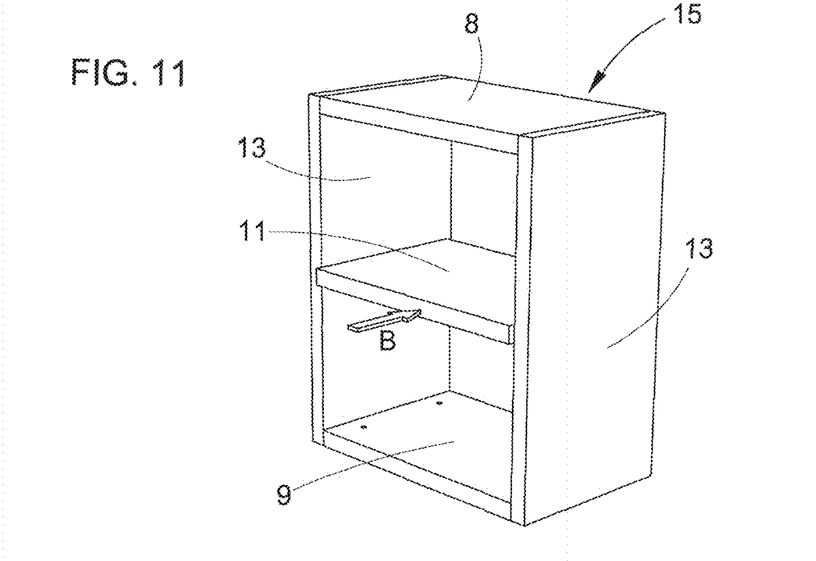

FIG. 11 shows the condition wherein the shelf 11, following the movement described above, finds itself placed perpendicularly to the uprights or shoulders 13 of the item of furniture 15 and partially inserted in the boxed body. In this configuration the head 28 of the ferrule 24, projecting with respect to the casing 16 of the pin 12, finds itself at the first portion 44' of the opening 44 of the bushing and at the slanted surface 48 of the same. In this condition the shelf 11 is pre-positioned and does not need a support for avoiding its falling or displacement, bearing in mind the constructive configuration of pin and bushing described above.

Figure 12:
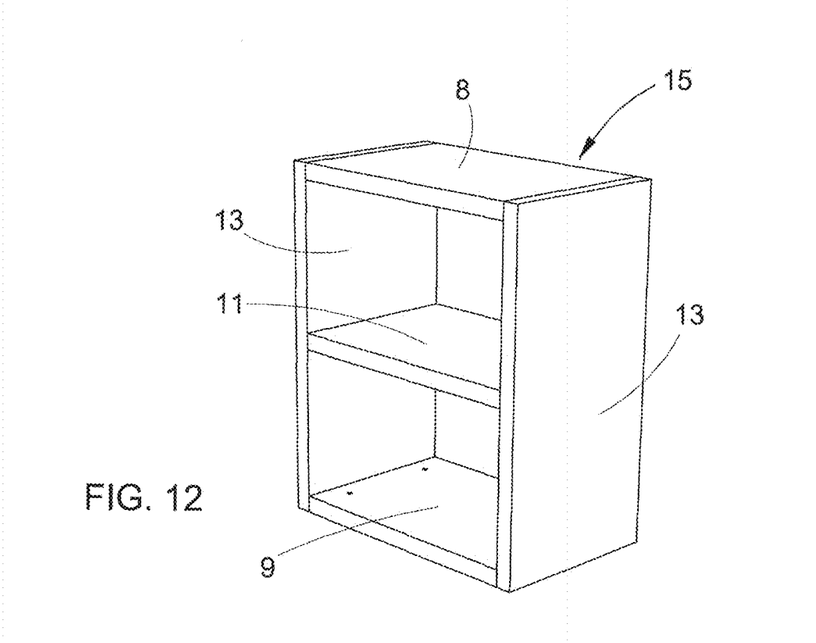

On the shelf 11 positioned in this way a thrust action is exerted along the plane of position of the shelf, as indicated by the arrow B in FIG. 12, so that the head 28 of the ferrule 24, sliding in the bushing 14, passes from the first portion 44' to the second portion 44" of the through opening 44 of said bushing with the stem 25 which engages in the C-shaped compartment 46.

The ferrule 24 of the pin 12, inserted in this way in the second portion 44", is attached and secured by interference. However, by acting in rotation on the grub screw 36 by means of the tool 21, the backward movement of the slider 22 is imposed and the ferrule of the pin is locked, as detailed previously, which configures a further and additional clamping (as schematised in FIG. 8).

In this latter case the shelves 11 must be provided with an appropriate hole in a perpendicular position to that of the hole of insertion of the pin, in order to allow the introduction of the tool which has to actuate rotation of the grub screw 36.

The procedure of disassembly of the shelf 11 follows, with a reverse process, the same phases described above with reference to the assembly. In particular the slanted plane or surface 48 of the bushing 14 eases the uncoupling between the bushing and the pin in that it imposes on the ferrule 24 a backward movement inside the body or casing 16 of the pin itself. This action is necessary taking account of the fact that the bushing is completely inserted in one of the components to be joined and does not project externally to the same.

As can be seen from the above the advantages that the device of the invention achieves are clear.

The device for assembly/joining of parts of furniture and furnishing accessories of the invention allows advantageously the assembly of furniture of the shelf units, bookcases or other furnishing accessories type, keeping hidden from view the joining elements, with a consequent improvement in the aesthetic worth of the item of furniture.

A further advantage is represented by the fact that the device of the invention allows a reduction in the machining processes necessary for its installation on the components to be joined of the furniture with a consequent advantage in terms of costs.

Further advantageous is the fact that the device of assembly of furniture of the invention, as well as being easy to install with respect to the components of the furniture, allows an easy and convenient, as well as rapid, assembly and disassembly of said components.

A further advantage is represented by the fact that the slanted plane of the bushing facilitates the operation of disassembly in that it accompanies the plug of the pin in its gradual backward movement inside the body of the pin and, at the same time, co-operates with the elastic element of the same pin guiding the elastic return of the stem externally to the casing of the pin.

A further advantage is represented by the fact that the presence of the appendage or lip of the bushing allows a pre-coupling between the bushing and the pin and a pre-positioning of the shelf without the need to have to retain the same for example with the hands and without the risk that the same can fall or tilt.

Although the invention has been described above with particular reference to one of its embodiments given solely by way of a non-limiting example, numerous changes and variations will appear clear to a person skilled in the art in light of the description given above. The present invention therefore intends to embrace all the changes and variations which come within the scope of the following claims.

The invention claimed is:

1. An assembly/joining device (10) for parts or components of modular furniture and furnishing accessories of the shelf units, bookcases, cupboards, bed frames type and the like, comprising a pin (12) and a bushing (14) inserted in dedicated seats made in the components of the furniture to be joined and attached rigidly one with respect to the other, the pin (12) comprising a body or casing (16) and a ferrule (24) integral with a slider (22) elastically retractable internally to the pin apt to couple with the bushing (14) and cooperating with a slanted plane or surface (48) defining an aid for the elastic backward movement of said ferrule (24) during the uncoupling of said pin (12) and bushing (14) and formed at a first portion (44') of an opening (44) of the bushing (14) starting from a front face (45) in the direction of an opposite rear face (43), with said first portion (44') defining a zone of entry/exit for the ferrule (24) of the pin (12) likewise cooperating with an appendage or lip (46) formed at a second portion (44") of the opening (44) to define a zone of stop or clamping for said pin, with the appendage or lip (46) developed along part of the internal circumferential edge of said opening (44) along the plane of the front face (45), wherein the device comprises means for clamping the pin (12) with respect to the bushing (14) comprising a grub screw (36) inserted crosswise to the outer body or casing (16) and to the slider (22) of the pin (12) and provided with an eccentric portion (38) placed in a pocket (32) formed in the slider (22) and developed along a cutting plane parallel to the axial plane of said slider, said portion (38) which engages with an inner rear profile (32") of the pocket (32) so as to define a cam drive for performing a backward movement of the slider (22) inside the casing (16) suitable for forcing a lower face of a head (28) of the ferrule (24) against a rear face of the appendage or lip (46) opposite to a front face of the same lip and of an edge or collar (20) of the body or casing (16) with the front face of said appendage or lip (46) of the bushing (14).

2. The assembly/joining device according to claim 1, wherein the ferrule (24) of the pin (12) co-operates with an elastic contrast element (26) placed between the bottom of said body or casing (16) and the bottom of the slider (22) on the opposite side with respect to the ferrule (24), the ferrule (24) comprising a stem (25), a head (28) having a diameter greater than that of the stem and comprised within an inner diameter of the casing (16) and a vertex portion (30) of said expansion made in an anti-friction material.

3. The assembly/joining device according to claim 1, wherein the appendage or lip (46) comprises two opposite slanted portions (46') which, starting from the inner edge of the front face (45), develop with increasing slope to define a C-shaped compartment (46") with said opposite slanted portions (46') which define a guide for insertion of the stem (25) of the ferrule (24) of the pin (12) in the C-shaped compartment.

4. The assembly/joining device according to claim 1, wherein the means of clamping between the pin (12) and the bushing (14) are defined by the C-shaped compartment (46") of the appendage or lip (46) of the bushing (14) having a size corresponding to the diameter of the stem (25) of the ferrule (24) and suitable for receiving a circumferential portion of said stem with an interference connection.

5. Method for the assembly of shelves (11) in an item of furniture (15) comprising two opposite and parallel uprights or shoulders (13), an upper base or plane (8) and a lower base or plane (9) using the assembly/joining device according to claim 1, said method comprising the steps of: inserting of the bushings (14) in seats formed in the shoulders or uprights (13) and of the pins (12) in holes formed on opposite side edges of the shelf (11), the bushings (14) not externally projecting from the insertion seats and the pins (12) placed in the respective holes with each said ferrule (24) projecting externally with respect to the edges of the shelf; inserting of a shelf (11) between the opposite shoulders or uprights (13) according to a plane slanted with respect to that of said uprights, with the ferrules (24) of the pins (12) of one of the side edges of the shelf in contact with the bushings (14) of the facing upright at the first portion (44') of the opening (44) of the bushing; moving of the shelf (11) from the slanted position to a position along a plane perpendicular to the plane of the uprights (13) with all the heads (28) of the ferrules (24) of the pins (12) in contact with the corresponding bushings (14) at the respective first portions (44') of the openings (44) by means of a rotation movement of said shelf with respect to the contact points between the pins (12) of an edge of the shelf and the corresponding facing bushings (14) of an upright with a simultaneous backward movement of the ferrules (24) inside the bodies or casings (16) of the pins (12); sliding of the heads (28) in the respective second portions (44") of the openings (44) of the corresponding bushings with forcing of the stems (25) of the ferrules (24) in the C-shaped compartment (46") of said second portions by means of a thrust action on the shelf along the plane of position of the shelf itself; and an additional locking/clamping of the ferrules (24) of the pins (12) in the respective bushings (14) acting on a grub screw (36) of each said pin (12) by means of a tool (21) for driving a backward movement of the slider (22) of said pin (12) internally to the body or casing (16) apt to perform a forcing through contact of a lower face of the head (28) of the pin (12) with a rear face of the appendage or lip (46) of the bushing (14) and of an edge or collar (20) of the body or casing (16) of the pin (12) with the front face (45) of the bushing (14).

6. The assembly/joining device according to claim 2, wherein the appendage or lip (46) comprises two opposite slanted portions (46') which, starting from the inner edge of the front face (45), develop with increasing slope to define a C-shaped compartment (46") with said opposite slanted portions (46') which define a guide for insertion of the stem (25) of the ferrule (24) of the pin (12) in the C-shaped compartment.

7. The assembly/joining device according to claim 2, wherein the means of clamping between the pin (12) and the bushing (14) are defined by the C-shaped compartment (46") of the appendage or lip (46) of the bushing (14) having a size corresponding to the diameter of the stem (25) of the ferrule (24) and suitable for receiving a circumferential portion of said stem with an interference connection.

8. The assembly/joining device according to claim 3, wherein the means of clamping between the pin (12) and the bushing (14) are defined by the C-shaped compartment (46") of the appendage or lip (46) of the bushing (14) having a size corresponding to the diameter of the stem (25) of the ferrule (24) and suitable for receiving a circumferential portion of said stem with an interference connection.

* * * * *